United States Patent
Zheng et al.

(10) Patent No.: US 9,100,391 B2
(45) Date of Patent: Aug. 4, 2015

(54) PORTAL AUTHENTICATION METHOD AND ACCESS CONTROLLER

(75) Inventors: Tao Zheng, Beijing (CN); Jianfeng Liu, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/131,166

(22) PCT Filed: May 18, 2012

(86) PCT No.: PCT/CN2012/075720
§ 371 (c)(1),
(2), (4) Date: Jan. 6, 2014

(87) PCT Pub. No.: WO2013/023470
PCT Pub. Date: Feb. 21, 2013

(65) Prior Publication Data
US 2014/0237572 A1 Aug. 21, 2014

(30) Foreign Application Priority Data
Aug. 18, 2011 (CN) .......................... 2011 1 0241974

(51) Int. Cl.
*H04L 29/06* (2006.01)
*H04W 12/06* (2009.01)
(Continued)

(52) U.S. Cl.
CPC .......... *H04L 63/083* (2013.01); *H04L 61/2015* (2013.01); *H04L 63/0892* (2013.01); *H04W 12/06* (2013.01); *H04W 84/12* (2013.01); *H04L 61/6022* (2013.01)

(58) Field of Classification Search
CPC combination set(s) only.
See application file for complete search history.

(56) References Cited

U.S. PATENT DOCUMENTS 7,542,468 B1  6/2009  Begley
8,797,856 B1 * 8/2014  Ballal et al. .................. 370/230

(Continued)

FOREIGN PATENT DOCUMENTS

CN  1697377  11/2005
CN  1708021  12/2005
CN  1728580   2/2006

(Continued)

OTHER PUBLICATIONS

CN First Office Action dated Jun. 5, 2013 issued on CN Patent Application No. 201110241974.5 dated Aug. 18, 2011, The State Intellectual Property Office, P.R. China.

(Continued)

*Primary Examiner* — Beemnet Dada
(74) *Attorney, Agent, or Firm* — Mannava & Kang, P.C.

(57) ABSTRACT

In a portal authentication method, a DHCP request message sent by a terminal is received by an AC. In response to finding that a user of the terminal is an unauthenticated user, a private network IP address is assigned to the terminal. After portal authentication of the terminal is finished, a wireless connection of the terminal is terminated by the AC. When a DHCP request message sent by the terminal again is received, a determination that the user of the terminal passes the authentication is made by the AC, a public network IP address is assigned to the terminal, and an accounting request message is sent to a RADIUS server. After finding that the terminal is offline, an accounting stop message is sent by the AC to the RADIUS server, the wireless connection of the terminal is disconnected, and the public network IP address is released.

15 Claims, 4 Drawing Sheets

(51) Int. Cl.
*H04W 84/12* (2009.01)
*H04L 29/12* (2006.01)

(56) References Cited

U.S. PATENT DOCUMENTS

2014/0223538 A1* 8/2014 Van De Velde et al. ........ 726/12
2015/0032510 A1* 1/2015 Farahat ........................ 705/7.34

FOREIGN PATENT DOCUMENTS

| CN | 101141492 | 3/2008 |
| CN | 101286858 | 10/2008 |
| CN | 102244866 | 11/2011 |
| CN | 1458763 | 11/2013 |
| EP | 18767854 | 1/2008 |
| JP | 2001211180 | 8/2001 |

OTHER PUBLICATIONS

International Search Report and Written Opinion dated Aug. 30, 2012 issued on PCT Patent Application No. PCT/CN2012/075720 filed on May 18, 2012, The State Intellectual Property Office, the P.R. China.
CN Second Office Action dated Feb. 8, 2014 issued on CN Patent Application No. 201110241974.5 dated Aug. 18, 2011, The State Intellectual Property Office, P.R. China.
Extended European Search Report dated Apr. 14, 2015, EP Patent Application No. 12824021.5 filed May 18, 2012, European Patent Office.
Gau Lu et al: The design for ethernet access concentrator, Proceedings International Conferences on Info-Tech and Info-Net (IC11) 2001. IEEE, Beijing, vol. 5, Oct. 29, 2001, pp. 223-228, CP010576991, DOI 10.1109/IC11.2001.983522, ISBN: 978-0-7803-7010-4=figure 3, p. 223, line 30- p. 227, line 29.

* cited by examiner

PORTAL AUTHENTICATION METHOD AND ACCESS CONTROLLER

CLAIM FOR PRIORITY

The present application is a national stage filing under 35 U.S.C 371 of PCT application number PCT/CN2012/075720, having an international filing date of May 18, 2012, which claims priority to Chinese patent application number 201110241974.5, filed on Aug. 18, 2011, the disclosures of which are hereby incorporated by reference in their entireties.

BACKGROUND

In a mobile Metropolitan Area Network (MAN) architecture, the secure authentication for a user is normally implemented in portal mode, and the authentication control point is located in an Access Controller (AC) of the MAN.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to. The term "based on" means based at least in part on. In addition, the terms "a" and "an" are intended to denote at least one of a particular element.

Figure 1:
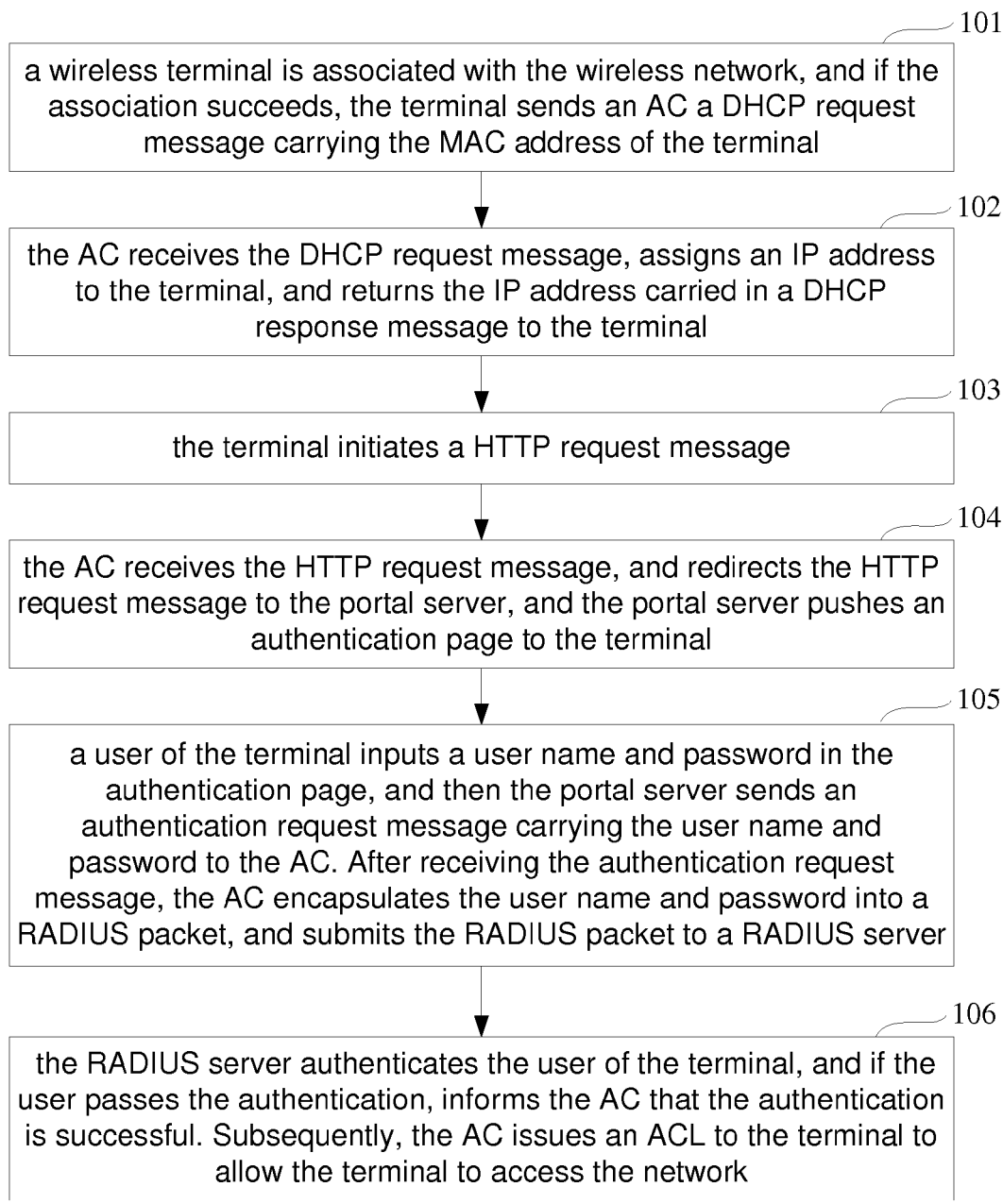
FIG. 1 is a schematic diagram illustrating a portal authentication when a terminal accesses an existing wireless network.

At first, the portal authentication when a terminal accesses an existing wireless network will be briefly described hereinafter with respect to FIG. 1. As shown in FIG. 1, the authentication process includes the following operations.

Block 101, firstly, a wireless terminal is associated with the wireless network, and if the association succeeds, the terminal sends an AC a Dynamic Host Configuration Protocol (DHCP) request message carrying the Media Access Control (MAC) address of the terminal.

Block 102, the AC receives the DHCP request message, assigns an Internet Protocol (IP) address to the terminal, and returns the IP address carried in a DHCP response message to the terminal.

If a DHCP template is configured in the AC, the AC assigns the IP address to the terminal itself, and returns the IP address carried in a DHCP response message to the terminal. If an external DHCP server is adopted, the AC needs to forward the DHCP request message to the DHCP server. The DHCP server assigns the IP address to the terminal, and returns the IP address carried in a DHCP response message to the AC, and then the AC returns the DHCP response message to the terminal.

Block 103, the terminal initiates a Hyper-Text Transfer Protocol (HTTP) request message.

Block 104, the AC receives the HTTP request message, and redirects the HTTP request message to the portal server, and the portal server pushes an authentication page to the terminal.

Block 105, a user of the terminal inputs a user name and password in the authentication page, and then the portal server sends an authentication request message carrying the user name and password to the AC. After receiving the authentication request message, the AC encapsulates the user name and password into a Remote Authentication Dial In User Service (RADIUS) packet, and submits the RADIUS packet to a RADIUS server.

Block 106, the RADIUS server authenticates the user of the terminal, and if the user passes the authentication, informs the AC that the authentication is successful. Subsequently, the AC issues an Access Control List (ACL) to the terminal to allow the terminal to access the network.

For a Wide Local Area Network (WLAN) user, after the user turns on a terminal, the terminal is automatically connected with the wireless network, and immediately initiates a DHCP request for obtaining an IP address, whether or not the user is authenticated, the terminal may obtain the IP address. Thus, the address resources are wasted. This is especially true with mobile networks because the mobile networks all assign a public network IP address to a user at present, and as such, the address resources are quite precious. The problem often occurs that a user really wanting to access the network cannot obtain an IP address, but a user that does not want to access the network unintentionally occupies an IP address.

Normally, in order to solve the IP-address-shortage problem, some applications adopt a Network Address Translation (NAT) mode. However, in the NAT mode, one public network address corresponds to multiple private network addresses and thus, a user cannot be precisely traced.

Examples of the present disclosure will be further described in detail hereinafter with reference to the accompanying drawings.

Figure 2:
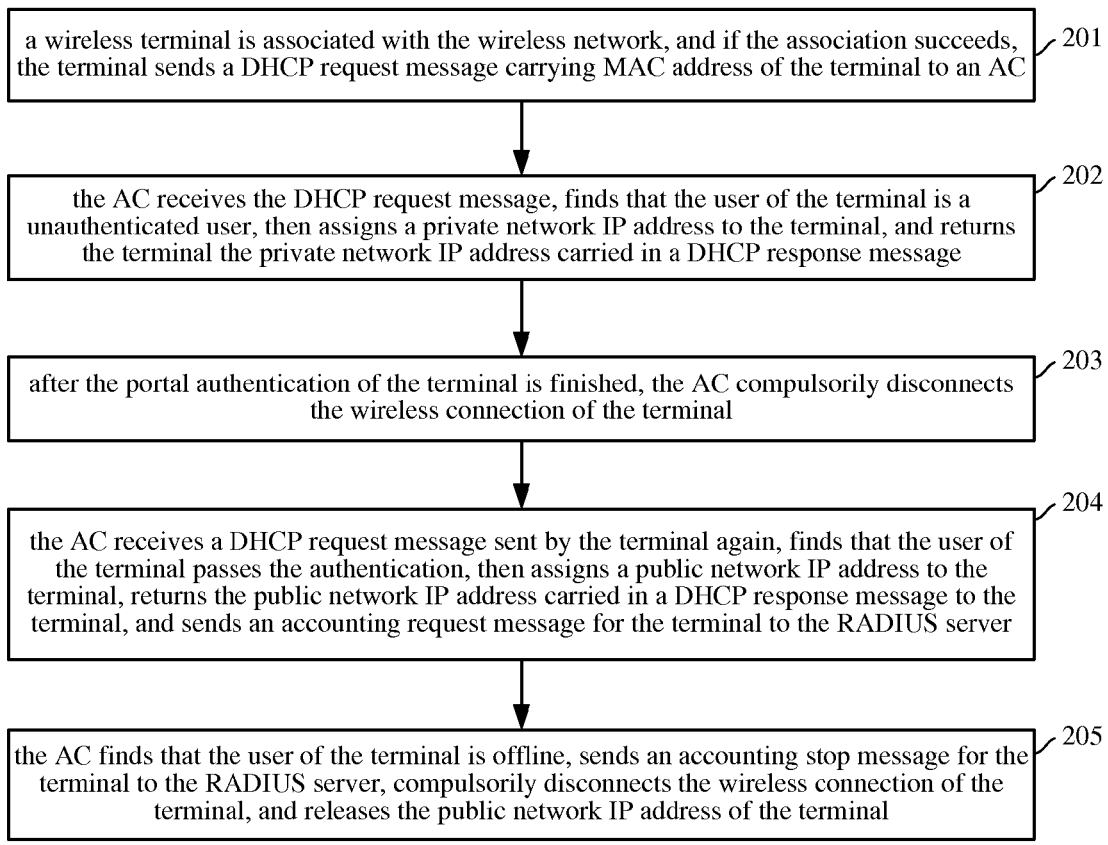
FIG. 2 is a flowchart illustrating a portal authentication method of a wireless terminal according to an example of the present disclosure.

FIG. 2 is a flowchart illustrating a portal authentication method of a wireless terminal according to an example of the present disclosure. As shown in FIG. 2, the method includes the following operations.

Block 201, a wireless terminal is associated with the wireless network, and if the association succeeds, the terminal sends a DHCP request message carrying a MAC address of the terminal to an AC.

Block 202, the AC receives the DHCP request message, finds that the user of the terminal is a unauthenticated user, then assigns a private network IP address to the terminal, and returns the private network IP address carried in a DHCP response message to the terminal.

The AC maintains an authenticated-user list. When a user of a terminal passes the authentication, the AC adds the MAC address of the terminal in the list. In the present operation, after receiving the DHCP request message, if the AC finds that the MAC address of the terminal carried in the DHCP request message is not in the authenticated-user list, the AC determines that the user of the terminal is an unauthenticated user.

If a DHCP template is configured in the AC, the AC assigns the private network IP address to the terminal itself, and returns the private network IP address carried in the DHCP response message to the terminal. If an external DHCP server is adopted, the AC plays a DHCP relay role, and forwards the DHCP request message sent by the terminal to the DHCP server. Here, an interface address carried in the DHCP request message is a private network IP address of the AC, to ensure the DHCP server to assign a private network IP address to the terminal.

Block 203, after the portal authentication of the terminal is finished, the AC disconnects the wireless connection of the terminal.

Block 204, the AC receives a DHCP request message sent by the terminal again, finds that the user of the terminal passes the authentication, then assigns a public network IP address to the terminal, returns the public network IP address carried in a DHCP response message to the terminal, and sends a RADIUS server an accounting request message indicating to start accounting for the terminal.

In the present operation, after receiving the DHCP request message, if the AC finds that the MAC address of the terminal carried in the DHCP request message is in the authenticated-user list, the AC determines that the user of the terminal passes the authentication.

If a DHCP template is configured in the AC, the AC assigns the public network IP address to the terminal itself, and returns the public network IP address carried in the DHCP response message to the terminal. If an external DHCP server is adopted, after receiving the DHCP request message, the AC needs to forward the DHCP request message to the DHCP server. The interface address in the DHCP request message is a public network IP address of the AC interface, to ensure the DHCP server to assign a public network IP address to the terminal.

Block 205, the AC finds that the user of the terminal is offline, sends the RADIUS server an accounting stop message indicating to stop the accounting for the terminal, disconnects the wireless connection of the terminal, and releases the public network IP address of the terminal.

If a DHCP template is configured in the AC, the AC directly informs the DHCP template to release the public network IP address of the terminal. If an external DHCP server is adopted, the AC imitates the terminal to send a DHCP release message carrying the MAC address of the terminal to the DHCP server. After receiving the DHCP release message, the DHCP server searches out the public network IP address of the terminal according to the MAC address of the terminal, and releases the public network IP address. When the user of the terminal is offline, the AC cancels the MAC address of the terminal from the authenticated-user list.

After the wireless connection of the terminal is disconnected, the terminal is associated with the wireless network again and requests an IP address. Since the user of the terminal becomes an unauthenticated user again, the AC will reassign a private network IP address to the terminal.

Figure 3:
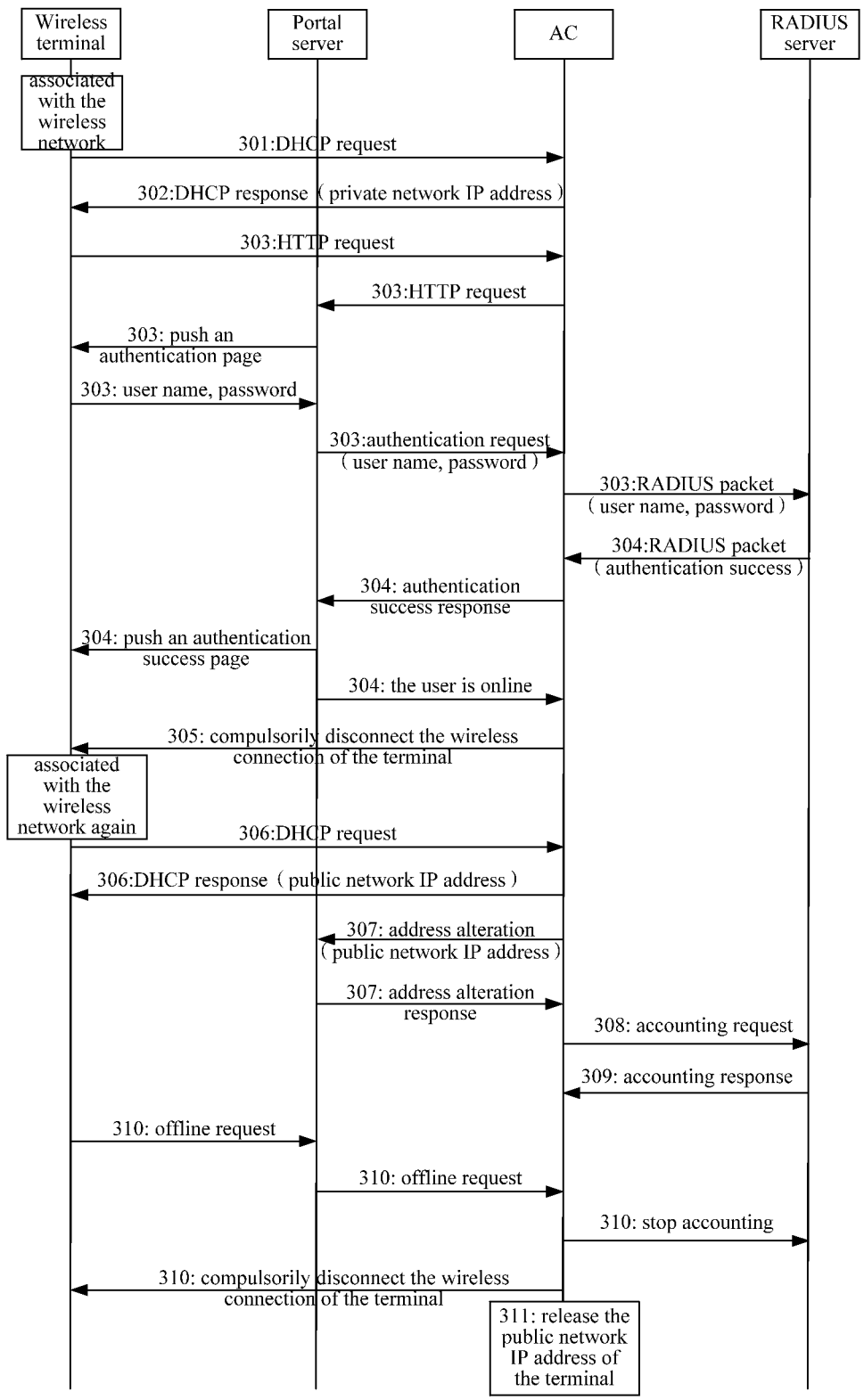
FIG. 3 is a flowchart illustrating a portal authentication method of a wireless terminal according to another example of the present disclosure.

FIG. 3 is a flowchart illustrating a portal authentication method of a wireless terminal according to another example of the present disclosure. As shown in FIG. 3, the method includes the following operations.

Block 301, a wireless terminal is associated with the wireless network, and if the association succeeds, the terminal sends a DHCP request message carrying a MAC address of the terminal to an AC.

Block 302, the AC receives the DHCP request message, finds that the user of the terminal is an unauthenticated user, assigns a private network IP address to the terminal, and returns the private network IP address carried in a DHCP response message to the terminal.

The AC maintains an authenticated-user list. When a user of a terminal passes the authentication, the AC adds a MAC address of the terminal in the list. In the present operation, after receiving the DHCP request message, if the AC finds that the MAC address of the terminal carried in the DHCP request message is not in the authenticated-user list, the AC determines that the user of the terminal is an unauthenticated user.

If a DHCP template is configured in the AC, the AC assigns the private network IP address to the terminal itself, and returns the private network IP address carried in the DHCP response message to the terminal. If an external DHCP server is adopted, the AC plays a DHCP relay role, and forwards the DHCP request message sent by the terminal to the DHCP server. Here, the interface address carried in the DHCP request message is a private network IP address of the AC, to ensure the DHCP server to assign a private network IP address to the terminal.

Block 303, the terminal initiates a random HTTP request message. The AC receives the HTTP request message, and redirects the HTTP request message to a portal server, and the portal server pushes an authentication page to the terminal. The user of the terminal inputs a user name and password in the authentication page, and then the portal server sends the user name and password carried in an authentication request message to the AC. After receiving the authentication request message, the AC encapsulates the user name and password into a RADIUS packet, and submits the RADIUS packet to a RADIUS server.

Block 304, the RADIUS server authenticates the user, and if the user passes the authentication, informs the AC that the user passed the authentication. The AC sends an authentication success response message to the portal server. The portal server receives the authentication success response message, pushes an authentication success page to the terminal, and informs the AC that the user of the terminal is online.

In this operation, the AC further adds the MAC address of the terminal in the authenticated-user list.

Block 305, The AC disconnects the wireless connection of the terminal.

Here, after disconnecting the wireless connection of the terminal, the AC may further release the private network IP address of the terminal. Specifically, if a DHCP template is configured in the AC, the AC directly informs the DHCP template to release the private network IP address of the terminal. If an external DHCP server is adopted, the AC imitates the terminal to send a DHCP release message carrying the MAC address of the terminal to the DHCP server. After receiving the DHCP release message, the DHCP server searches out the private network IP address of the terminal according to the MAC address of the terminal, and releases the private network IP address.

Block 306, the terminal is associated with the wireless network again, and after the association succeeds, the terminal initiates a DHCP request message to the AC again. The AC receives the DHCP request message, finds that the user of the terminal passes the authentication, then assigns a public network IP address to the terminal, returns the public network IP address carried in a DHCP response message to the terminal, and records a corresponding relation between the MAC address and the public network IP address of the terminal.

In this operation, after receiving the DHCP request message, if the AC finds that the MAC address of the terminal carried in the DHCP request message is in the authenticated-user list, the AC determines that the user of the terminal passes the authentication.

If a DHCP template is configured in the AC, the AC assigns the public network IP address to the terminal itself, and returns the public network IP address carried in the DHCP response message to the terminal. If an external DHCP server is adopted, after receiving the DHCP request message, the AC needs to forward the DHCP request message to the DHCP server. The interface address in the DHCP request message is a public network IP address of the interface of the AC, to ensure the DHCP server assigns a public network IP address to the terminal.

Block 307, the AC sends an address alteration message to the portal server, and the address alteration message carries the MAC address and the public network IP address of the terminal. The portal server receives the address alteration message, returns an address alteration response message to the AC, and records a corresponding relation of a user name, the MAC address and the public network IP address about the terminal in the portal server.

Block 308, the AC receives the address alteration response message, and sends a RADIUS server an accounting request message indicating to start accounting for the terminal.

Block 309, the RADIUS server receives the accounting request message, and returns an accounting response message. The user of the terminal starts to normally surf the Internet.

Block 310, the terminal actively initiates an offline request message carrying the public network IP address of the terminal. The portal server receives the offline request message, searches out the user name according to the public network IP address of the terminal, and sends the user name carried in the offline request message to the AC. The AC receives the offline request message, sends an accounting stop message carrying the user name to the RADIUS server, informs the portal server that the user of the terminal is offline, and disconnects the wireless connection of the terminal.

In this operation, after being informed that the user of the terminal is offline, the portal server further cancels the corresponding relation of user name, MAC address and public network IP address of the terminal. After the user of the terminal is offline, the AC further cancels the MAC address of the terminal from the authenticated-user list.

After the wireless connection of the terminal is disconnected, the terminal is associated with the wireless network again and requests an IP address. Since the user of the terminal becomes an unauthenticated user again, the AC will reassign a private network IP address to the terminal.

Block 311, the AC releases the public network IP address of the terminal.

If a DHCP template is configured in the AC, the AC directly informs the DHCP template to release the public network IP address of the terminal. If an external DHCP server is adopted, the AC imitates the terminal to send a DHCP release message carrying the MAC address of the terminal to the DHCP server. After receiving the DHCP release message, the DHCP server searches out the public network IP address of the terminal according to the MAC address of the terminal, and releases the public network IP address.

Figure 4:
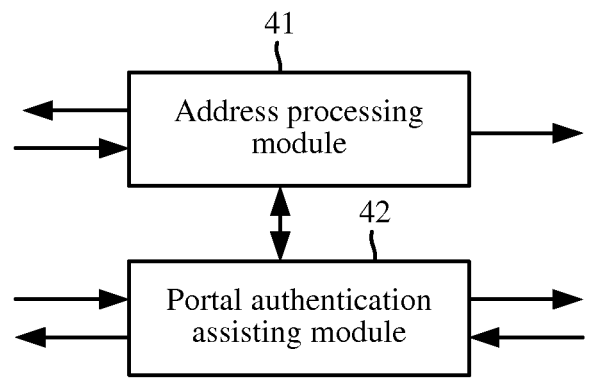
FIG. 4 is a block diagram illustrating a structure of an AC according to an example of the present disclosure.

FIG. 4 is a block diagram illustrating a structure of an AC according to an example of the present disclosure. As shown in FIG. 4, the AC includes an address processing module 41 and a portal authentication assisting module 42.

The address processing module 41 receives a DHCP request message sent by a wireless terminal. If finding that the user of the terminal is an unauthenticated user according to an authenticated-user list in the portal authentication assisting module 42, the address processing module 41 assigns a private network IP address to the terminal; and when receiving a user-IP-address-release instruction from the portal authentication assisting module 42, carrying the MAC address of the terminal, the address processing module 41 releases the private network IP address of the terminal. If finding that the user of the terminal is an authenticated user according to the authenticated-user list in the portal authentication assisting module 42, the address processing module 41 assigns a public network IP address to the terminal, and sends an address alteration message to a portal server. The address alteration message carries the MAC address and the public network IP address of the terminal. When receiving an address alteration response message returned by the portal server, the address processing module 41 sends an accounting request message to a RADIUS server. When finding that the terminal is offline, the address processing module 41 sends an accounting stop message carrying a user name of the terminal to the RADIUS server; cancels the MAC address of the terminal from the authenticated-user list in the portal authentication assisting module 42, disconnects the wireless connection of the terminal, and releases the public network IP address.

If a DHCP function is not configured for the AC, the address processing module 41 is further to forward a DHCP request message to the DHCP server after receiving the DHCP request message sent by the terminal. If finding that the user of the terminal is an unauthenticated user according to an authenticated-user list in the portal authentication assisting module 42, an interface address in the DHCP request message is a private network IP address of the AC; otherwise, the interface address in the DHCP request message is a public network IP address of the AC. The address processing module 41 sends a DHCP release message carrying the MAC address of the terminal to the DHCP server to release the private network IP address or the public network IP address of the terminal.

After receiving the HTTP request message initiated by the terminal, the portal authentication assisting module 42 redirects the HTTP request message to the portal server. After receiving an authentication request message carrying a user name and password sent by the portal server, the portal authentication assisting module 42 encapsulates the user name and password into a RADIUS packet, and sends the RADIUS packet to the RADIUS server. When receiving an authentication success information sent by the RADIUS server, the portal authentication assisting module 42 determines that the authentication is finished, adds the MAC address of the terminal into the authenticated-user list, disconnects the wireless connection of the terminal, and simultaneously sends a user-IP-address-release instruction carrying the MAC address of the terminal to the address processing module 41.

The address processing module 41 and the portal authentication assisting module 42 shown in FIG. 4 may be achieved with hardware circuit, or may be machine readable instructions stored in a memory.

Figure 5:
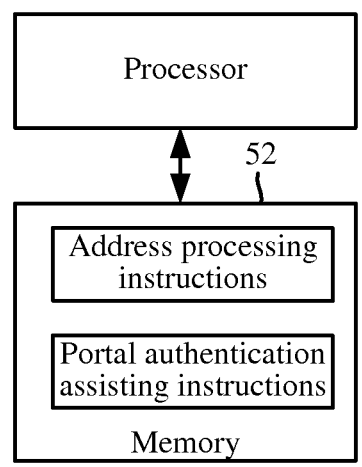
FIG. 5 is a block diagram illustrating a structure of an AC according to another example of the present disclosure.

FIG. 5 is a block diagram illustrating a structure of an AC according to another example of the present disclosure. As shown in FIG. 5, the AC includes a processor 51 and a memory 52.

The processor 51 is to communicate with the memory 52, and to execute machine readable instructions in the memory 52.

The memory 52 is to store the machine readable instructions, and the machine readable instructions may include address processing instructions 521 and portal authentication assisting instructions 522.

when being executed by the processor 51, the address processing instructions 521 are to: receive a DHCP request message sent by a wireless terminal, if the user of the terminal is found to be an unauthenticated user, assign a private network IP address to the terminal; when the portal authentication process of the terminal is finished, disconnect the wireless connection of the terminal; when a DHCP request message sent by the terminal again is received, determine that the user of the terminal passes the authentication, assign a public network IP address to the terminal, and send an accounting request message to a RADIUS server; when the terminal is found to be offline, send an accounting stop message to the RADIUS server, disconnect the wireless connection of the terminal, and release the public network IP address of the terminal.

When being executed by the processor 51, the portal authentication assisting instructions 522 are to: after a private network IP address is assigned to the terminal, if a HTTP request message initiated by the terminal is received, redirect the HTTP request message to a portal server; when a user name and password sent by the portal server is received, encapsulate the user name and password into a RADIUS packet, and send the RADIUS packet to the RADIUS server.

When being executed by the processor 51, the address processing instructions 521 are further to: after a public network IP address is assigned to the terminal, send the portal server an address alteration message carrying the MAC address and the public network IP address of the terminal; after receiving an address alteration response message returned by the portal server, send an accounting request message to the RADIUS server.

When being executed by the processor 51, the address processing instructions 521 are further to: after the portal authentication of the terminal is finished and the wireless connection of the terminal is disconnected, release the private network IP address of the terminal.

If a DHCP module is not configured in the AC, the address processing instructions 521 are executed by the processor further to: when the DHCP request message sent by the terminal is received and the user of the terminal is found to be an unauthenticated user, forward the DHCP request message to the DHCP server, and the interface address in the DHCP request message is a private network IP address of the AC; when a DHCP response message carrying a private network IP address returned by the DHCP server is received, forward the DHCP response message to the terminal; when a DHCP request message sent by the terminal again is received and the user of the terminal is determined as passing the authentication, forward the DHCP request message to the DHCP server, and the interface address in the DHCP request message is a public network IP address of the AC; when a DHCP response message carrying a public network IP address returned by the DHCP server is received, forward the DHCP response message to the terminal; after the portal authentication of the terminal is finished and the wireless connection of the terminal is disconnected, send a DHCP release message to the DHCP server; the DHCP release message carries the MAC address of the terminal, to inform the DHCP server to release the private network IP address of the terminal; after finding that the terminal is offline and the wireless connection of the terminal is disconnected, send a DHCP release message to the DHCP server. The DHCP message carries the MAC address of the terminal, to inform the DHCP server to release the public network IP address of the terminal.

The memory mentioned in the present disclosure includes a floppy disk, hard disk, magnetic optical disc, optical disc (such as CD-ROM, CD-R, CD-RW DVD-ROM, DVD-RAM, DVD-RW, DVD+RW), magnetic tape, nonvolatile memory, ROM, etc.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A portal authentication method, comprising:
   receiving, by an Access Controller (AC), a Dynamic Host Configuration Protocol (DHCP) request message sent by a terminal, and in response to finding that a user of the terminal is an unauthenticated user, assigning a private network IP address to the terminal;
   after portal authentication of the terminal is finished, disconnecting, by the AC, a wireless connection of the terminal;
   when receiving a DHCP request message sent by the terminal again, determining, by the AC, that the user of the terminal passes the authentication, assigning a public network IP address to the terminal, and sending an accounting request message to a Remote Authentication Dial In User Service (RADIUS) server; and
   after finding that the terminal is offline, sending, by the AC, an accounting stop message to the RADIUS server, disconnecting the wireless connection of the terminal, and releasing the public network IP address.

2. The method of claim 1, after assigning a private network IP address to the terminal and before portal authentication of the terminal is finished, the method further comprising:
   when receiving a Hyper-Text Transfer Protocol, HTTP, request message initiated by the terminal, redirecting, by the AC, the HTTP request message to a portal server; and
   when receiving a user name and password sent by the portal server, encapsulating, by the AC, the user name and password into a RADIUS packet, and sending the RADIUS packet to the RADIUS server.

3. The method of claim 1, after assigning a public network IP address to the terminal and before sending an accounting request message to the RADIUS server, the method further comprising:
   sending, by the AC, an address alteration message carrying a MAC address and the public network IP address of the terminal to the portal server;
   receiving, by the portal server, the address alteration message, returning an address alteration response message to the AC, and recording a corresponding relation of a user name, the MAC address and the public network IP address about the terminal in the portal server; and
   after receiving the address alteration response message by the AC, sending an accounting request message to the RADIUS server.

4. The method of claim 1, after the portal authentication of the terminal is finished and the wireless connection of the terminal is disconnected, the method further comprising:
   releasing, by the AC, the private network IP address assigned to the terminal.

5. The method of claim 1, wherein a DHCP module is not configured in the AC, wherein assigning a public network IP address to the terminal comprises:
- forwarding, by the AC, the DHCP request message to the DHCP server;
- wherein an interface address in the DHCP request message is a public network IP address of the AC;
- receiving, by the DHCP server, the DHCP request message, assigning a public network IP address to the terminal, recording a corresponding relation between a MAC address of the terminal and the public network IP address of the terminal, and returning the public network IP address carried in a DHCP response message to the AC; and
- returning, by the AC, the DHCP response message to the terminal; wherein releasing the public network IP address comprises:
- sending, by the AC, a DHCP release message carrying the MAC address of the terminal to the DHCP server; and
- receiving, by the DHCP server, the DHCP release message, searching out the public network IP address of the terminal according to the MAC address of the terminal, and releasing the public network IP address.

6. An Access Controller (AC) comprising:
a processor; and
a memory;
wherein the processor is to communicate with the memory, and to execute machine readable instructions stored in the memory;
wherein the memory stores machine readable instructions which are executable by the processor to: receive a Dynamic Host Configuration Protocol (DHCP) request message sent by a wireless terminal, in response to finding that a user of the terminal is an unauthenticated user, to assign a private network IP address to the terminal;
- when the portal authentication process of the terminal is finished, disconnect a wireless connection of the terminal;
- when a DHCP request message sent by the terminal again is received, determine that the user of the terminal passes the authentication, assign a public network IP address to the terminal, send an accounting request message to a Remote Authentication Dial In User Service, RADIUS, server; and
- when the terminal is found to be offline, send an accounting stop message to the RADIUS server, disconnect the wireless connection of the terminal, and release the public network IP address of the terminal.

7. The AC of claim 6, wherein the machine readable instructions stored in the memory are further to:
- after a private network IP address is assigned to the terminal, if a HTTP request message initiated by the terminal is received, redirect the HTTP request message to a portal server; and
- when a user name and password sent by the portal server is received, encapsulate the user name and password into a RADIUS packet, and send the RADIUS packet to the RADIUS server.

8. The AC of claim 6, wherein the machine readable instructions stored in the memory are further to:
- after a public network IP address is assigned to the terminal, send the portal server an address alteration message carrying a MAC address and the public network IP address of the terminal; and
- after an address alteration response message returned by the portal server is received, send an accounting request message to the RADIUS server.

9. The AC of claim 6, wherein the machine readable instructions stored in the memory are further to:
- after the wireless connection of the terminal is disconnected, release the private IP address assigned to the terminal.

10. The AC of claim 6, wherein a DHCP module is not configured in the AC and wherein the machine readable instructions stored in the memory are further to:
- when the DHCP request message sent by the terminal is received, forward the DHCP request message to the DHCP server;
- if the user of the terminal is an unauthenticated user, an interface address in the DHCP request message is a private network IP address of the AC, otherwise, the interface address in the DHCP request message is a public network IP address of the AC; and
- after the wireless connection of the terminal is disconnected, release the public network IP address of the terminal by sending a DHCP release message carrying a MAC address of the terminal to the DHCP server.

11. A portal authentication system, comprising:
a terminal;
an Access Controller (AC);
and a Remote Authentication Dial In User Service (RADIUS) server;
wherein the terminal is to send a Dynamic Host Configuration Protocol (DHCP) request message to the AC;
wherein the AC is to receive the DHCP request message sent by the terminal, and in response to finding that a user of the terminal is an unauthenticated user, to assign a private network IP address to the terminal;
after portal authentication of terminal is finished, to disconnect a wireless connection of the terminal;
when receiving a DHCP request message sent by the terminal again, to determine that the user of the terminal passes the authentication, assign a public network IP address to the terminal, and send an accounting request message to the RADIUS server;
after finding that the terminal is offline, to send an accounting stop message to the RADIUS server, disconnect the wireless connection of the terminal, and release the public network IP address; and
wherein the RADIUS server is to start accounting for the terminal according to the accounting request message sent by the AC; and to stop the accounting for the terminal according to the accounting stop message sent by the AC.

12. The system of claim 11, further comprising:
a portal server;
wherein after assigning the private network IP address to the terminal and before the portal authentication of the terminal is finished, the AC is further to, when receiving a Hyper-Text Transfer Protocol, HTTP, request message initiated by the terminal, redirect the HTTP request message to the portal server;
when receiving a user name and password sent by the portal server, to encapsulate the user name and password into a RADIUS packet, and send the RADIUS packet to the RADIUS server;
wherein the portal server is to push an authentication page to the terminal, receive the user name and password inputted in the authentication page by a user of the terminal, and send the user name and password to the AC; and
wherein the RADIUS server is further to authenticate the user of the terminal according to the user name and password in the RADIUS packet, after the user passes the authentication, to inform the AC that the authentication is successful.

13. The system of claim 11, after assigning the public network IP address to the terminal and before sending the accounting request message to the RADIUS server, the AC is further to send an address alteration message carrying a MAC address and the public network IP address of the terminal to the portal server;

after receiving an address alteration response message sent from the portal server, to send the accounting request message to the RADIUS server; and wherein the portal server is further to receive the address alteration message, return an address alteration response message to the AC, and record a corresponding relation of a user name, the MAC address and the public network IP address about the terminal in the portal server.

14. The system of claim 11, wherein after the portal authentication of the terminal is finished, the AC is further to disconnect a wireless connection of the terminal, and release the private network IP address assigned to the terminal.

15. The system of claim 11, wherein a DHCP module is not configured in the AC and wherein the system further comprises: a DHCP server;

wherein when the AC is to assign a public network IP address to the terminal, the AC is further to forward the DHCP request message to the DHCP server, and wherein an interface address in the DHCP request message is a public network IP address of the AC;

wherein the AC is to forward a DHCP response message carrying a public network IP address sent by the DHCP server to the terminal;

wherein when the AC is to release the public network IP address, the AC is further to send a DHCP release message carrying a MAC address of the terminal to the DHCP server;

wherein the DHCP server is to receive the DHCP request message forwarded by the AC, assign a public network IP address to the terminal, record a corresponding relation between the MAC address of the terminal and the public network IP address of the terminal, and return the public network IP address carried in a DHCP response message to the AC; and wherein the DHCP server is to receive the DHCP release message sent by the AC, search out the public network IP address of the terminal according to the MAC address of the terminal, and release the public network IP address.

* * * * *

UNITED STATES PATENT AND TRADEMARK OFFICE
CERTIFICATE OF CORRECTION

PATENT NO.        : 9,100,391 B2
APPLICATION NO.   : 14/131166
DATED             : August 4, 2015
INVENTOR(S)       : Zheng et al.

Page 1 of 1

It is certified that error appears in the above-identified patent and that said Letters Patent is hereby corrected as shown below:

In the claims

Column 8, line 41, Claim 2, delete "Hyper-Text Transfer Protocol, HTTP," and insert -- Hyper-Text Transfer Protocol (HTTP), --, therefor.

Column 9, lines 43-44, Claim 6, delete "Remote Authentication Dial In User Service, RADIUS," and insert -- Remote Authentication Dial In User Service (RADIUS), --, therefor.

Column 10, line 54, Claim 12, delete "Hyper-Text Transfer Protocol, HTTP," and insert -- Hyper-Text Transfer Protocol (HTTP), --, therefor.

Signed and Sealed this
Twelfth Day of July, 2016

Michelle K. Lee
*Director of the United States Patent and Trademark Office*